US012807022B2

(12) United States Patent
Qu et al.

(10) Patent No.: US 12,807,022 B2
(45) Date of Patent: Nov. 24, 2026

(54) ELECTRIC QUANTITY STATE ACQUISITION METHOD AND DEVICE, CHARGING DEVICE AND CHARGING SYSTEM

(71) Applicant: Autel Digital Power Co., Ltd., Shenzhen (CN)

(72) Inventors: Songsong Qu, Shenzhen (CN); Guangwen Feng, Shenzhen (CN)

(73) Assignee: AUTEL DIGITAL POWER CO., LTD., Shenzhen (CN)

(*) Notice: Subject to any disclaimer, the term of this patent is extended or adjusted under 35 U.S.C. 154(b) by 398 days.

(21) Appl. No.: 18/571,736

(22) PCT Filed: May 27, 2022

(86) PCT No.: PCT/CN2022/095746

§ 371 (c)(1),
(2) Date: Dec. 19, 2023

(87) PCT Pub. No.: WO2022/267827

PCT Pub. Date: Dec. 29, 2022

(65) Prior Publication Data

US 2024/0123855 A1 Apr. 18, 2024

(30) Foreign Application Priority Data

Jun. 21, 2021 (CN) ......................... 202110685877.9

(51) Int. Cl.
*B60L 53/62* (2019.01)
*B60L 53/31* (2019.01)
(Continued)

(52) U.S. Cl.
CPC ............... *B60L 53/62* (2019.02); *B60L 53/31* (2019.02); *B60L 53/65* (2019.02); *B60L 58/13* (2019.02)

(58) Field of Classification Search
CPC .......... B60L 53/65; B60L 58/13; B60L 53/14; B60L 53/665; B60L 2240/549;
(Continued)

(56) References Cited

U.S. PATENT DOCUMENTS

2011/0144823 A1 6/2011 Muller
2018/0339601 A1* 11/2018 Kruszelnicki ........... B60L 53/16
(Continued)

FOREIGN PATENT DOCUMENTS

CN 101634687 A 1/2010
CN 103187765 A 7/2013
(Continued)

OTHER PUBLICATIONS

International search report of PCT application No. PCT/CN2022/095746 issued on Jul. 25, 2022.
(Continued)

*Primary Examiner* — Phutthiwat Wongwian
(74) *Attorney, Agent, or Firm* — Andrew C. Cheng

(57) ABSTRACT

A state-of-charge acquisition method is applied to the charging device for charging an electric vehicle, and the method includes: acquiring an initial electric quantity data value upon start of charging of the electric vehicle with a VCI device; acquiring a charging current of a battery of the electric vehicle during a charging process; acquiring an electric quantity of the battery at a current moment on the basis of the charging current; and acquiring the electric quantity data value at the current moment on the basis of the initial electric quantity data, the electric quantity, and a rated total capacity of the electric vehicle, the electric quantity data value indicating a state-of-charge of the battery at the current moment. In this way, the electric quantity data value of the battery during the charging process can be obtained in real time.

17 Claims, 3 Drawing Sheets

(51) Int. Cl.
*B60L 53/65* (2019.01)
*B60L 58/13* (2019.01)

(58) Field of Classification Search
CPC ....... B60L 53/31; B60L 53/62; G01R 31/006; G01R 31/382; H02J 7/00; H02J 7/82; H02J 7/44; H02J 7/94; Y02T 10/70; Y02T 10/7072; Y02T 90/12; Y02T 90/16
USPC ............................................................ 702/63
See application file for complete search history.

(56) References Cited

U.S. PATENT DOCUMENTS

| | | | | |
|---|---|---|---|---|
| 2019/0212391 | A1* | 7/2019 | Koller | B60L 58/16 |
| 2021/0268929 | A1* | 9/2021 | Cater | B60L 53/67 |
| 2023/0219451 | A1* | 7/2023 | Qu | B60L 3/0046 320/109 |
| 2024/0286514 | A1* | 8/2024 | Qu | B60L 53/62 |

FOREIGN PATENT DOCUMENTS

| | | | |
|---|---|---|---|
| CN | 104159777 | A | 11/2014 |
| CN | 106882068 | A | 6/2017 |
| CN | 107979136 | A | 5/2018 |
| CN | 108215892 | A | 6/2018 |
| CN | 207603238 | U | 7/2018 |
| CN | 109212419 | A | 1/2019 |
| CN | 111781518 | A | 10/2020 |
| CN | 112319299 | A | 2/2021 |
| CN | 113561832 | A | 10/2021 |
| JP | 2010268602 | A | 11/2010 |
| JP | 2016154424 | A | 8/2016 |
| KR | 102032872 | B1 | 10/2019 |

OTHER PUBLICATIONS

The first office action of CN application No. 202110685877.9 issued on Aug. 31, 2023.
The search report of CN application No. 202110685877.9 issued on Aug. 31, 2023.

* cited by examiner

ELECTRIC QUANTITY STATE ACQUISITION METHOD AND DEVICE, CHARGING DEVICE AND CHARGING SYSTEM

CROSS-REFERENCE TO RELATED APPLICATIONS

The present application is the National Stage application for International Patent Application No. PCT/CN2022/095746, filed on May 27. 2022, which claims priority to Chinese Patent Application No. 202110685877. 9, entitled "ELECTRIC QUANTITY STATE ACQUISITION METHOD AND DEVICE, CHARGING DEVICE AND CHARGING SYSTEM", filed on Jun. 21, 2021 with the China National Intellectual Property Administration, the entire contents of which are incorporated herein by reference.

TECHNICAL FIELD

The present application relates to the technical field of charging, and in particular to a state-of-charge acquisition method and device, charging device and charging system.

BACKGROUND

Automotive exhaust is one of the main causes of environmental pollution, and electric vehicles have emerged in recent years. Electric vehicles are powered by electrical energy, energy-saving and environmental protection, and are actively encouraged by the government, which quickly enter people's vision, and are loved by the general public. At present, charging of electric vehicles is mainly accomplished through charging devices (e.g. charging piles).

However, the charging devices currently on the market are only capable of charging the electric vehicle, and cannot obtain the electric quantity data value (e.g. SOC value) of the battery of an electric vehicle during a charging process in real time. Then, it is naturally impossible for the user to know how much power is charged into the battery of the electric vehicle, which causes inconvenience to the user.

SUMMARY

The embodiments of the present application aim to provide a state-of-charge acquisition method and device, a charging device and a charging system, capable of acquiring a electric quantity data value of a battery during a charging process in real time.

To achieve the above-mentioned object, in a first aspect, the present application provides a state-of-charge acquisition method applied to a charging device for charging an electric vehicle, the method comprising:

acquiring an initial electric quantity data value upon start of charging of the electric vehicle with a VCI device;

acquiring a charging current of a battery of the electric vehicle during a charging process;

acquiring an electric quantity of the battery at a current moment on the basis of the charging current; and acquiring the electric quantity data value at the current moment on the basis of the initial electric quantity data, the electric quantity, and a rated total capacity of the electric vehicle, the electric quantity data value indicating a state-of-charge of the battery at the current moment.

In an alternative aspect, the method further comprises, before acquiring the electric quantity data value at the current moment on the basis of the initial electric quantity data, the electric quantity, and a rated total capacity of the electric vehicle;

acquiring a vehicle identification code of the electric vehicle via the VCI device; and obtaining the rated total capacity of the electric vehicle on the basis of the vehicle identification code.

In an optional aspect, the acquiring an electric quantity of the battery at a current moment on the basis of the charging current comprises:

the electric quantity $C_t$ of the battery at the current moment is:

$$C_t = \int_{t_0}^{t} \eta I \cdot d_\tau,\ \eta$$

representing charging efficiency, I representing the charging current at moment t, moment t representing the current moment, moment $t_0$ representing the moment at which charging is just started, and $d_\tau$ representing an integral over time.

In an alternative aspect, the electric quantity data value is an SOC value, the SOC value being a ratio of a remaining electric quantity of the battery to a nominal capacity of the battery.

In an alternative aspect, the SOC value $SOC_t$ at the current moment is $$SOC_t = \left(SOC_0 + \frac{C_t}{C_{rated}}\right) \times 100\%,$$

the $SOC_0$ being an initial SOC value and $C_{rated}$ being the rated total capacity.

In an alternative aspect, the charging device comprises a CP detection module; and before acquiring an initial electric quantity data value upon start of charging of the electric vehicle with a VCI device, the method further comprises:

detecting whether a charging gun is inserted into a charging interface of the electric vehicle by the CP detection module; and if it is detected by the CP detection module that the charging gun is inserted into the charging interface of the electric vehicle, performing the step of acquiring an initial electric quantity data value upon start of charging of the electric vehicle with a VCI device.

In an alternative aspect, the charging device comprises a display module; and after the acquiring the electric quantity data value at the current moment, the method further comprises:

displaying the electric quantity data value in real time by the display module.

In a second aspect, the present application provides a tate-of-charge acquisition device applied to a charging device for charging an electric vehicle, wherein the device comprises:

a first acquisition unit for acquiring an initial electric quantity data value upon start of charging of the electric vehicle with a VCI device;

a second acquisition unit for acquiring a charging current of a battery of the electric vehicle during a charging process;

a third acquisition unit for acquiring an electric quantity of the battery at a current moment on the basis of the charging current; and a fourth acquisition unit for acquiring the electric quantity data value at the current moment on the basis of the electric quantity, the initial electric quantity data, and a rated total capacity of the electric vehicle, the electric quantity data, value indicating a state-of-charge of the battery at the current moment.

In a third aspect, the present application provides a charging device comprising:

a CP detection module for detecting whether a charging gun is inserted into a charging interface of the electric vehicle;

a control module, coupled to the CP detection module, for determining the electric quantity data value of the battery of the electric vehicle at any moment when the CP detection module detects that the charge gun is inserted into the charging interface of the electric vehicle, the control module comprising:

at least one processor and a memory communicatively coupled to the at least one processor, the memory storing instructions executable by the at least one processor, the instructions being executable by the at least one processor to enable the at least one processor to perform the method as described above.

In an optional aspect, the charging device further comprises:

a sampling module for collecting a charging current of the battery of the electric vehicle during the charging process; and a display module for displaying the electric quantity data value of the battery in real time.

In an alternative aspect, the charging device is a charging pile.

In a third aspect, the present application provides a charging system wherein the charging system comprises an electric vehicle, a VCI device and a charging device as described above.

In a fourth aspect, the present application provides a computer-readable storage medium having stored thereon computer-executable instructions that, when executed by a charging device, cause the charging device to perform the method as described above.

Advantageous effects of the embodiments of the present application are: the state-of-charge acquisition method provided in the present application is applied to a charging device for charging an electric vehicle, and the charging device is used for acquiring data information about the electric vehicle via a VCI device, the method comprising acquiring a charging current of a battery of the electric vehicle during a charging process, acquiring the electric quantity of the battery at the current moment on the basis of the charging current, acquiring an initial electric quantity data value when the electric vehicle just starts charging via the VCI device, and acquiring the electric quantity data value at the current moment on the basis of the initial electric quantity data, the electric quantity and the rated total capacity of the electric vehicle. Therefore, in the above-mentioned manner, the electric quantity data value of the battery during the charging process can be obtained in real time, and then the electric quantity data is displayed, for example, on the charging device, so that the user can know in real time how much electric quantity the battery of the electric vehicle has been charged, which brings convenience to the user.

BRIEF DESCRIPTION OF THE DRAWINGS

One or more embodiments are illustrated by way of examples, which do not constitute limitation on the embodiments, in the figures of the corresponding accompanying drawings, in which elements having the same reference numeral designations represent similar elements, and in which the figures are not to scale unless otherwise specified.

DETAILED DESCRIPTION OF TIDE INVENTION

In order that the objects, aspects and advantages of the embodiments of the present application will become more apparent, a more clear and complete description of the embodiments of the present application will be rendered by reference to the appended drawings. The described embodiments are a part of, not all of the embodiments of the present application. On the basis of the embodiments in the present application, all the other embodiments obtained by a person of ordinary skill in the art without involving any inventive effort fall within the scope of protection of the present application.

Figure 1:
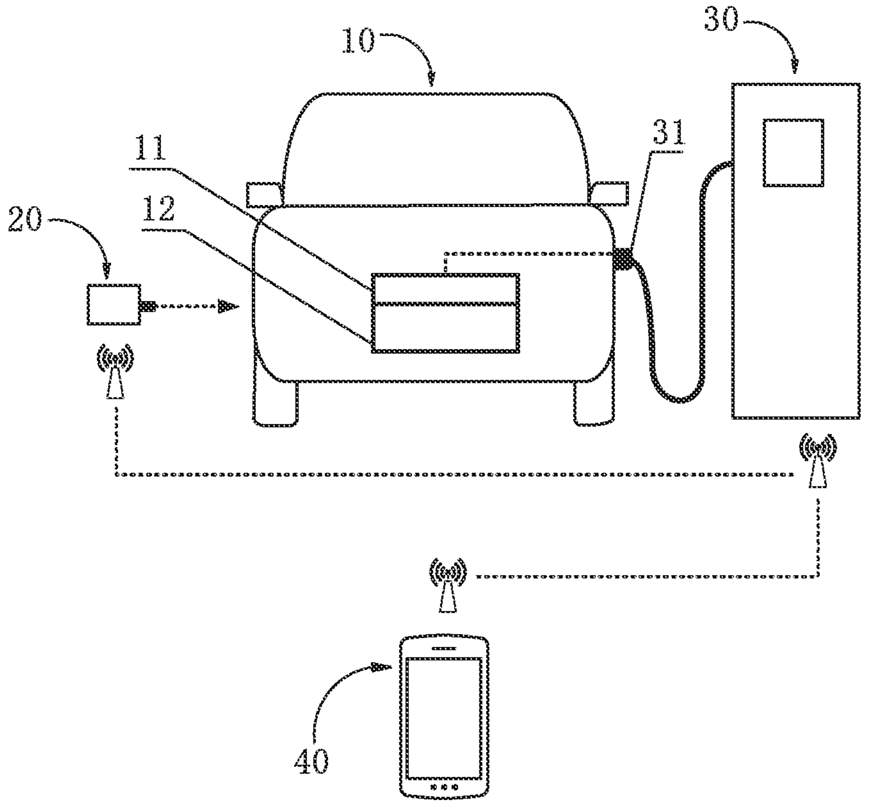
FIG. 1 is a schematic diagram of an application scenario provided by an embodiment of the present application.

In order to facilitate an understanding of the present application, a description is first given of the following application scenarios to which the present application may be applied, with reference to FIG. 1. FIG. 1 is an application scenario of a charging control method provided by an embodiment of the present application, in which an electric vehicle 10, a VCI device 20, a charging pile 30, and a mobile terminal 40 are included.

Here, the VCI device 20 is a portable mobile device that can be inserted into an OBD port of the electric vehicle 10 and supports reading and writing the CAN bus message of the electric vehicle 10.

The mobile terminal 40 includes, but is not limited to: smartphones (such as Android mobile phones, iOS mobile phones and other mobile phones equipped with other operating systems), tablet computers, palmtop computers and notebook computers.

The specific types of mobile terminals 40 are listed above, but those skilled in the art will recognize that embodiments of the present application are not limited to the types listed above, but are applicable to any other types of mobile terminals 40.

As shown in FIG. 1, an electric vehicle 10 is provided with a BMS 11 (BMS is collectively referred to as a battery management system) and a power battery 12 (for example, a lithium battery), wherein the BMS 11 is a set of control systems for protecting the use safety of the power battery 12, and the use state of the power battery 12 is monitored at all times. A charging pile 30 is used to charge the lithium battery 12, which charging process needs to be controlled by the BMS 11. Thus, during a charging process, the BMS 11 can control the manner in which the charging pile 30 charges the power battery 12, such as a constant current charging manner or a variable current charging manner. At the same time, the BMS 11 can also control the magnitude of the charging current that the charging pile 30 charges the power battery 12 and the change in the parameter of the power battery 12.

When the VCI device 20 is inserted into the OBD port of the electric vehicle 10 through the arrow direction, the VCI device 20 can communicate with the electric vehicle 10 and can acquire information about a battery, for example, the amount of power of the battery, from the BMS 11 in the electric vehicle 10. At the same time, the VCI device 20 can be communicatively connected to the charging pile 30, and then the charging pile 30 can send an instruction to the VCI device 20 so as to obtain relevant information about the electric vehicle 10 via the VCI device 20, for example, obtaining a vehicle identification code of the electric vehicle, a vehicle identification number (also referred to as a frame number), namely, a VIN code, which is a group of seventeen letters or numbers, and is used for a unique group of numbers on an automobile, so as to identify materials such as a manufacturer of the automobile, an engine, a chassis serial number and other of the automobile.

When a charging gun 31 of the charging pile 30 is inserted into the charging interface of the electric vehicle 10, the charging pile 30 starts charging the power battery 12 in the electric vehicle 10. At the same time, the charging pile 30 can be communicatively connected to the VCI device 20, and a VIN code of the electric vehicle 10 can be acquired via the VCI device 20, and then information such as a manufacturer, a model and a production year of the electric vehicle 10 can be parsed thereby, so that information such as a rated total capacity of the electric vehicle can be further obtained from a database. Finally, the charging pile 30 can calculate, according to the acquired information, an electric quantity data value of the battery during the charging process, such as a SOC value, wherein the SOC value is a ratio of a remaining electric quantity of the battery to a nominal capacity of the battery. During the charging process of the battery, the SOC value will change continuously, and by acquiring the SOC value during the charging process in real time, it can be used to determine how much the electric quantity value the power battery 12 currently has. On the one hand, the SOC value can be displayed in real time via the charging pile, so that the user can know how much power battery 12 has been charged and how long it can be filled, which is convenient for the user. For example, the user can estimate the time when power battery 12 is fully charged, so that the user can better grasp the approximate time when the user can take the vehicle. On the other hand, the charging pile can also determine the moment of stopping the charging of the battery according to the obtained electric quantity data value, and stop the charging process in time when the battery is charged to a preset electric quantity, so that it is possible to prevent the battery from being overcharged and affecting the service life of the battery.

The electric quantity data value may be an SOC value or a remaining electric quantity value of the battery.

Figure 2:
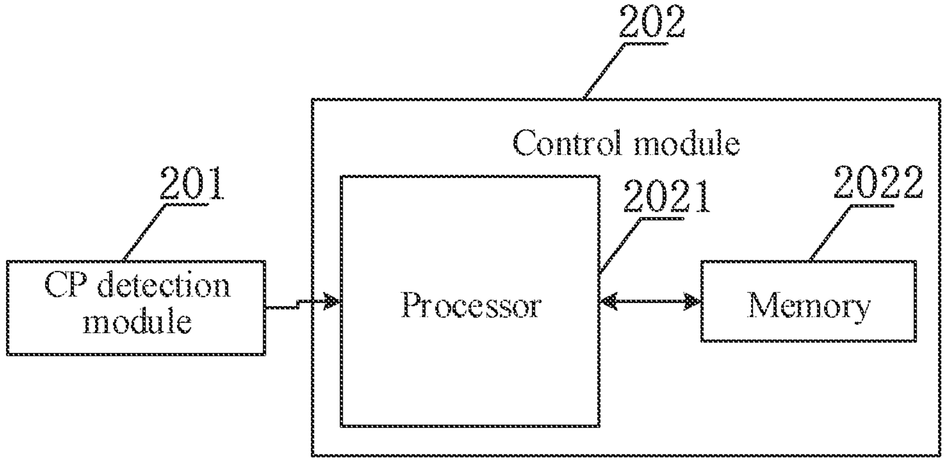
FIG. 2 is a structural schematic diagram of a charging device according to an embodiment of the present application.

Illustratively, with reference to FIG. 2, a schematic diagram of a hardware structure of one possible charging device that may be used to implement the charging control method provided by an embodiment of the present application is shown.

As shown in FIG. 2, the charging device comprises a CP detection module 201 and a control module 202, wherein in the charging device, a control pilot (CP) signal is a signal for detecting whether the charging device is connected to the electric vehicle, so the CP detection module 201 can detect whether the charging gun is plugged into the charging interface of the electric vehicle by detecting the CP signal, wherein if it is detected that no charger is plugged into the charging interface of the electric vehicle, it may be that the charger is unplugged from the charging interface, or that the charger is not plugged into the charging interface.

The control module 202 is connected to the CP detection module 201, and when the CP detection module 201 detects that the charging gun is inserted into the charging interface of the electric vehicle, the control module 202 can learn that the charging gun is inserted into the charging interface via the CP detection module 201, and then the control module 202 starts to calculate the electric quantity data value of the battery of the electric vehicle at any time in real time during a charging process.

The control module 202 may employ, among other things, a microcontroller unit (MCU) or digital signal processing (DSP) controller.

The control module 202 comprises at least one processor 2021 and a memory 2022, wherein the memory 2022 can be built in the control module 202 or external to the control module 202, and the memory 2022 can also be a remotely arranged memory, and the control module 202 is connected via a network.

The memory 2022 serves as a non-volatile computer-readable storage medium for storing non-volatile software programs, non-volatile computer-executable programs, and modules. The memory 2022 can comprise a program storage area and a data storage area, wherein the program storage area can store an operating system and an application program required by at least one function. The storage data area may store data created according to the use of the terminal, etc. In addition, the memory 2022 may include high speed random access memory and may also include non-volatile memory, such as at least one magnetic disk storage device, flash memory device, or other non-volatile solid state storage device. In some embodiments, the memory 2022 may optionally include a memory remotely located with respect to processor 2021, which may be connected to the terminal via a network. Examples of such networks include, but are not limited to, the Internet, intranets, local area networks, mobile communication networks, and combinations thereof.

The processor 2021 performs various functions of the terminal and processes the data by running or executing the software programs and/or modules stored in the memory 2022 and invoking the data stored in the memory 2022, thereby monitoring the terminal as a whole, for example, implementing the power status acquisition method in any embodiment of the present application.

The processors 2021 may be one or more, with one processor 2021 being exemplified in FIG. 1. The processor 2021 and memory 2022 may be connected by a bus or other means. The processor 2021 may include a central processing unit (CPU), a digital signal processor (DSP), an application specific integrated circuit (ASIC), a controller, a field programmable gate array (FPGA) device, etc. The processor 2021 may also be implemented as a combination of computing devices, e.g. a combination of a DSP and a microprocessor, a plurality of microprocessors, one or more microprocessors in conjunction with a DSP core, or any other such configuration.

It should be noted that the hardware configuration of the charging device as shown in FIG. 2 is merely an example, and that the charging device may have more or less components than those shown in the figure, may combine two or more components, or may have different component configurations, and that the various components shown in the figure may be implemented in hardware, software, or a combination of hardware and software including one or more signal processing and/or application specific integrated circuits.

Figure 3:
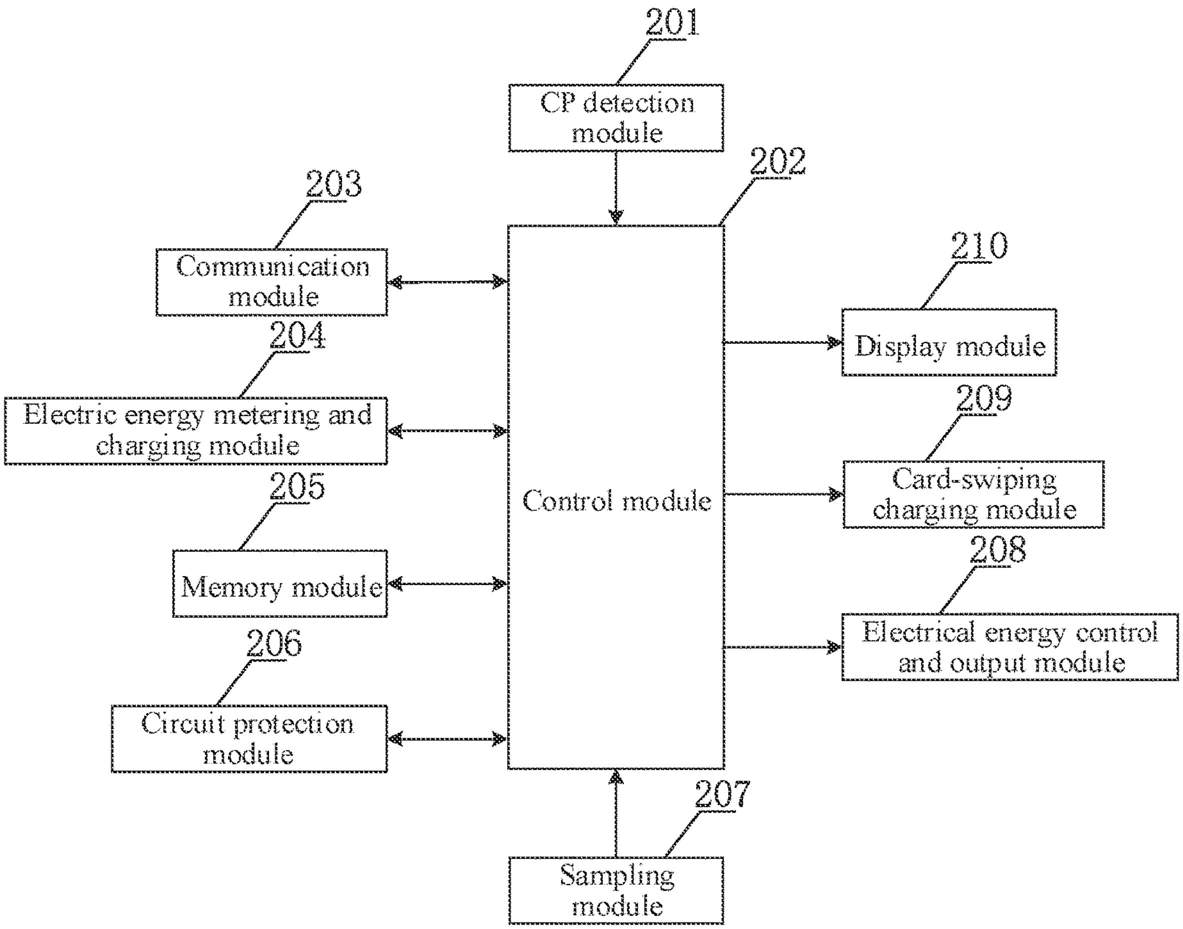
FIG. 3 is a structural schematic diagram of a charging device according to another embodiment of the present application.

For example, as shown in FIG. 3, the charging device further comprises a communication module 203, an electric energy metering and charging module 204, a memory module 205, a circuit protection module 206, a sampling module 207, an electric energy control and output module 208, a card-swiping charging module 209 and a display module 210. Each of these modules is connected to and controlled by the control module 202.

The control module 202 communicates data with a server, an intelligent terminal (e.g. a mobile phone), an electric vehicle, etc. via a communication module 203 via WIFI, bluetooth, 4G, CAN, etc. For example, if the control module 202 communicates with the handset via the communication module 203, the handset may receive data such as the current charging current of the battery from the control module 207.

According to the detected charging current of the battery, the electric energy metering and charging module 204 uses an ampere-hour integration method, namely, integrating the charging current within a preset time period, so as to obtain the metering of the electric energy charged into the electric vehicle within the preset time period. Further, the electric energy , metering and charging module 204 may determine a fee to be charged on the basis of the charging criteria and the metering of the electric energy charged to the electric vehicle.

The memory module 205 can store relevant data (e.g. a charging current) during the charging process and the like, and can also store a mapping relationship between a preset set charging current and an electric quantity data value (e.g. a SOC value) and the like.

The circuit protection module 206 is used to protect the charging device from over-voltage or over-current to prevent damage to the charging device or the electric vehicle.

The sampling module 207 is used for collecting the charging current of the battery of the electric vehicle during the charging process, and at the same time, the sampling module 207 can also collect parameters such as voltage or temperature so as to provide effective data for the calculation of electric quantity, the control of temperature and the protection of circuit.

The electric energy control and output module 208 is used to control the input electric energy of the charging device to the electric vehicle. For example, the electric energy control and output module 208 may control parameters such as the maximum output current of the charging device to the electric vehicle.

The card-swiping charging module 209 is used for realizing the charging function of the charging device.

The display module 210 is used for interacting with a user, and the display module 210 can display contents such as the electric quantity when charging, the fee required to be paid by the user, and the SOC value of the battery of the electric vehicle.

Therefore, the charging device can realize communication and interaction of data with an external device, control of parameters of a charging process, display of battery-related data of the electric vehicle, and metering and charging of electric quantity.

In one embodiment, the charging device is a charging pile, a charging gun is provided on the charging pile, a battery of the electric vehicle can be charged by inserting the charging gun into a charging interface of the electric vehicle, and at the same time, the charging pile can control the charging process of the battery.

Figure 4:
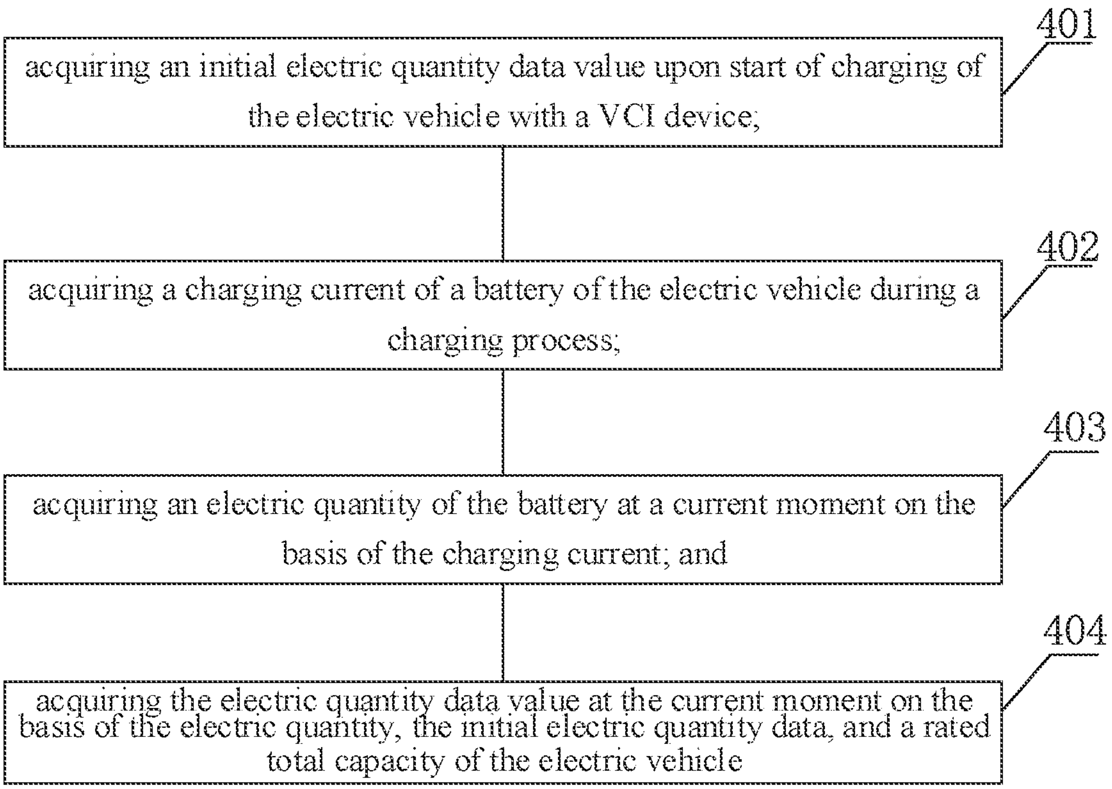
FIG. 4 is a flow chart of a state-of-charge acquisition method provided in an embodiment of the present application.

FIG. 4 is a flow chart showing a state-of-charge acquisition method applied to a charging device for charging an electric vehicle according to an embodiment of the present application. The method may be performed by a charging device as shown in FIG. 1, FIG. 2 or FIG. 3, the method comprising, as shown in FIG. 4:

Step 401: the initial electric quantity data value at the time of starting charging of the electric vehicle is acquired by the VCI device.

In one embodiment, if the charging device includes the CP detection module 201 as shown in FIG. 2 or FIG. 3, the CP detection module 201 may be used to detect whether a charging gun is inserted into a charging interface of the electric vehicle before obtaining an initial electric quantity data value upon start of charging of the electric vehicle through the VCI device.

If it is not detected that the charging gun is inserted into the charging interface of the electric vehicle, it is not necessary to execute step 401, and the execution of step 401 is started only when it is detected that the charging gun is inserted into the charging interface of the electric vehicle, so that the accuracy of detection can be improved.

Then, after the charging device is started, the charging device actively establishes a connection with the VCI device for information exchange, for example, the charging device is communicatively connected with the VCI device via WIFI, bluetooth, a wired connection, etc.

Before the charging is started, the charging device sends a command to the VCI device to acquire an initial electric quantity data value, for example, an initial SOC value, collected by the BMS on the electric vehicle, the SOC value being a ratio of the remaining electric quantity of the battery to the nominal capacity of the battery. The electric quantity data value may be an SOC value, or may be a remaining electric quantity value of the battery, etc. which is not limited herein.

Step 402: a charging current of a battery of the electric vehicle during the charging process is acquired.

Step 403: on the basis of the charging current, the electric quantity of the battery at a current moment is acquired.

In one embodiment, if the charging device comprises a sampling module 207 and an electric energy metering and charging module 204 as shown in FIG. 3. When the charging device charges the electric vehicle, the collecting module 207 can collect the charging current in real time, and then the electric energy metering and charging module 204 can calculate the electric quantity of the battery at any time according to the ampere-hour integration method.

Specifically, the electric quantity $C_t$ of the battery at the current moment is:

$$C_t = \int_{t_0}^{t} \eta I \cdot d_\tau, \eta$$

representing a charging efficiency, I representing a charging current at moment t, moment t representing the current moment, time $t_0$ representing the time at which charging is just started, and $d_\tau$ representing an integral over time. By calculating the integral of the formula, the electric quantity $C_t$ of the battery at any moment can be obtained. It is well known that when the electric vehicle is charged, it is not directly connected with the storage battery via an external charger, but the storage battery of the electric vehicle is charged via an OBC, which mainly plays a protective role, wherein an OBC of a vehicle means an on-board charger. Then, considering the charging efficiency of OBC, etc. the $\eta$ value will not be 100%, so that the calculated electric quantity $C_t$ can be made more accurate by adding the $\eta$ value to the calculation formula.

Step 404: the electric quantity data value at the current moment is acquired on the basis of the electric quantity, the initial electric quantity data, and the rated total capacity of the electric vehicle.

In one embodiment, the rated total capacity of the electric vehicle can be obtained by first the charging device sending an instruction to the VCI device that the VIN code (vehicle identification code) of the electric vehicle is required, then the information such as the manufacturer, model and production year of the electric vehicle can be parsed through the obtained VIN code, and finally the rated total capacity (also referred to as the nominal capacity of the battery) of the electric vehicle can be obtained by looking up the corresponding vehicle in a pre-stored database.

Then, the electric quantity data value at the current moment can be acquired according to the electric quantity, the initial electric quantity data and the rated total capacity of the electric vehicle, and the electric quantity data value being SOC value is taken as an example for explanation.

At this time, the SOC value $SOC_t$ at the current moment is:

$$SOC_t = \left(SOC_0 + \frac{C_t}{C_{rated}}\right) \times 100\%,$$

wherein $SOC_t$ is an initial SOC value, and $C_{rated}$ is the rated total capacity of the electric vehicle. In the above-mentioned formula, $$\frac{C_t}{C_{rated}}$$

represents a ratio of the electric quantity value for charging the battery to the rated total capacity during this charging process, namely, the electric quantity value for actually charging the battery, added with the initial SOC value, so as to obtain the SOC value at the current moment.

Further, if the charging device can know the electric quantity data value of the battery of the electric vehicle, the electric vehicle can know how much electric quantity the battery has been charged on the basis of the electric quantity data value obtained in real time, and then the charging process can be ended in time when the electric quantity of the battery is full, so as to prevent the battery from being overcharged from affecting its service life.

In addition, if the charging device comprises a display module 210 as shown in FIG. 3, after acquiring the electric quantity data value of the battery, the electric quantity data value can be displayed on the display module 210, so that a user can know through the display module 210 how much the electric quantity value of the battery has been charged specifically, and can also know the approximate time point when the charging process ends, which is beneficial for the user to better schedule his own time, namely, providing convenience for the user.

At the same time, THE user can also directly use a mobile phone to perform a communication connection with THE charging device, and directly use the mobile phone to acquire THE electric quantity data value of THE battery from the charging device. for example, the mobile phone can perform a wireless connection or a wired connection with the charging device, wherein the wireless connection can comprise a connection method such as WIFI, bluetooth, 4G or 5G, and the wired connection can comprise a connection method such as a connection via a USB line.

In another embodiment, since the charging device can know the electric quantity charged by the electric vehicle during the charging process, it is also possible to achieve more precise control of the charging process of the battery to further extend the service life of the battery. It is still explained by example of taking the electricity data value as SOC value.

In particular, the mode of the charging process may be set to a healthy mode and a normal mode, different charging processes are implemented for the two modes, and displayed on the display module of the charging device or on the user's handset before starting the charging to provide the user with a selection of the currently required charging mode.

If the charging mode is the healthy mode, the charging process of the battery is ended when the SOC value is greater than or equal to a preset threshold value. The preset threshold value is less than 1. Since the SOC value is a ratio less than or equal to 1, that is to say, a maximum value of the SOC value is 1, at this moment, the preset threshold value is set to be less than 1 so as to control that the SOC value will not reach 1 during the charging process of the battery, that is to say, the battery will not reach a fully charged state. This is because, in general, a rechargeable battery is a lithium battery, and the physical characteristics of the lithium battery determine that a battery with a shallow charge and a shallow discharge (i.e. not fully charged and fully discharged) can obtain a longer battery life. Therefore, the control stops the charging process when the SOC value is less than 1, and the service life of the battery can be extended. For example, by setting the first preset threshold to 80%, in the healthy mode, when the charging device detects that the SOC value of the battery has been greater than or equal to 80%, i.e. the charging process of the battery is switched off, the battery is no longer charged.

If the charging mode is the normal mode, the charging process of the battery is ended when the SOC value of the battery is greater than or equal to 1. In this mode, the charging process of the battery is interrupted and the charging of the battery is stopped only if the charging device detects that the SOC value of the battery is 100%. At this time, the electric quantity of the battery is full, so that the user can use the battery for a longer time.

Therefore, when the user needs to continuously use the electric vehicle for a long period of time, the charging mode may be set to the normal mode to meet the demand, and during daily use, for example, when the electric vehicle is used for commuting in a short distance, the charging mode may be set to the healthy mode to extend the service life of the battery.

In summary, in the present application, firstly, an initial electric quantity data value and a vehicle identification code of the electric vehicle are acquired by means of a VCI device, and the rated total capacity of the electric vehicle is determined by the vehicle identification code of the electric vehicle, then the electric quantity of a battery at the current moment is determined by the detected charging current, and finally, the electric quantity data value of the battery is determined according to the initial electric quantity data value of the electric vehicle, the rated total capacity of the electric vehicle and the electric quantity of the battery at the current moment, and the electric quantity data value of the battery is used for indicating the state-of-charge of the battery at the current moment, namely, how much electric quantity the current battery is charged.

At the same time, the electric quantity data value is also displayed via a charging device or a mobile terminal such as a mobile phone, so as to bring convenience to the user and improve the user experience. Furthermore, the charging process of the battery can be further controlled according to the electric quantity data value, and not only can the charging process of the battery be stopped in time so as to prevent damage to the battery caused by overcharging, but also can the charging be performed by adopting the health mode so as to extend the service life of the battery.

Figure 5:
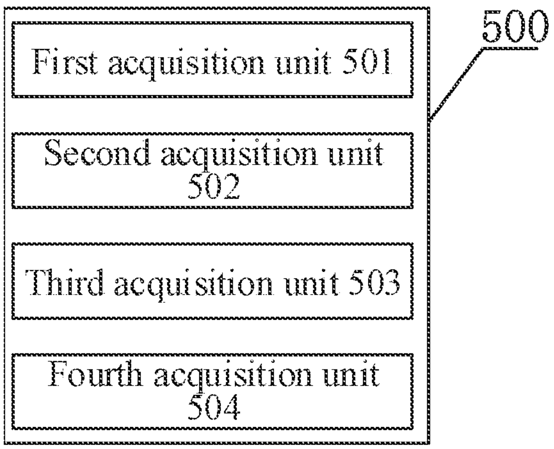
FIG. 5 is a structural schematic diagram of a state-of-charge acquisition device according to an embodiment of the present application.

FIG. 5 is a structural schematic diagram of a charging control device according to an embodiment of the present application. As shown in FIG. 5, the charging control device 500 includes a first acquisition unit 501, a second acquisition unit 502, a third acquisition unit 503, and a fourth acquisition unit 504.

The first acquisition unit 501 is configured to acquire an initial electric quantity data value upon start of charging of the electric vehicle by the VCI device. The second acquisition unit 502 is configured to acquire a charging current of a battery of the electric vehicle during a charging process. The third acquisition unit 503 is configured to acquire the electric quantity of the battery at the current moment on the basis of the charging current. The fourth acquisition unit 504 is configured to acquire an electric quantity data value at the current moment on the basis of the electric quantity, the initial electric quantity data, and a rated total capacity of the electric vehicle, the electric quantity data value indicating the state-of-charge of the battery at the current moment.

Since the device embodiment and the method embodiment are on the basis of the same concept, the contents of the device embodiment may refer to the method embodiment without the contents conflicting with each other, and the description thereof will not be repeated.

Embodiments of the present application also provide a charging system including an electric vehicle, a VCI device, and a charging device as described in any of the embodiments.

Embodiments of the present application also provide a computer-readable storage medium having stored thereon computer-executable instructions that, when executed by a charging device, cause the charging device to perform the method as described in any of the embodiments above.

Embodiments of the application also provide a computer program product comprising a computer program stored on a computer readable storage medium, the computer program comprising program instructions which, when executed by a computer, cause the computer to perform the method as described in any one of the embodiments above.

Finally, it should be noted that: the above-mentioned embodiments are merely illustrative of the technical solution of the present application, and do not limit same. Under the idea of the present application, the technical features in the embodiments or in different embodiments may also be combined, the steps may be implemented in any order, and there are many other variations of the different aspects of the present application as described above, which are not provided in detail for the sake of brevity. Although the present application has been described in detail with reference to the foregoing embodiments, those skilled in the art will appreciate that: the technical solutions disclosed in the above-mentioned embodiments can still be amended, or some of the technical features thereof can be replaced by equivalents. However, these modifications or substitutions do not bring the essence of the corresponding technical solutions out of the scope of the technical solutions of the various embodiments of the present application.

The invention claimed is:

1. An electric quantity state acquisition method applied to a charging device for charging an electric vehicle, wherein the electric quantity state acquisition method comprises: acquiring an initial electric quantity data value upon start of charging of the electric vehicle with a vehicle communication interface (VCI) device;

acquiring a charging current of a battery of the electric vehicle during a charging process; acquiring an electric quantity of the battery at a current moment according to the charging current; and acquiring the electric quantity data value at the current moment by calculating a sum of the initial electric quantity data and a ratio of the electric quantity to a rated total capacity of the electric vehicle, the electric quantity data value indicating a state-of-charge of the battery at the current moment.

2. The electric quantity state acquisition method according to claim 1, wherein the electric quantity state acquisition method further comprises, before acquiring the electric quantity data value at the current moment on the basis of the initial electric quantity data, the electric quantity, and a rated total capacity of the electric vehicle:

acquiring a vehicle identification code of the electric vehicle via the VCI device; and obtaining the rated total capacity of the electric vehicle by retrieving a predetermined correspondence using the vehicle identification code.

3. The electric quantity state acquisition method according to claim 1, wherein the acquiring an electric quantity of the battery at a current moment according to the charging current comprises: the electric quantity $C_t$ of the battery at the current moment is: $C_t=\int_{t0}^{t}\eta I\cdot d_\tau$, $\eta$ representing charging efficiency, I representing the charging current at moment t, moment t representing the current moment, moment $t_0$ representing the moment at which charging is just started, and $d_\tau$ representing an integral over time.

4. The electric quantity state acquisition method according to claim 3, wherein the electric quantity data value is a State of Charge (SOC) value, the SOC value being a ratio of a remaining electric quantity of the battery to a nominal capacity of the battery.

5. The electric quantity state acquisition method according to claim 4, wherein the SOC value $SOC_t$ at the current moment is $$SOC_t = \left(SOC_0 + \frac{C_t}{C_{rated}}\right) \times 100\%,$$

the $SOC_0$ being an initial SOC value and $C_{rated}$ being the rated total capacity.

6. The electric quantity state acquisition method according to claim 1, wherein the charging device comprises a Control Pilot (CP) detection module; and before acquiring an initial electric quantity data value upon start of charging of the electric vehicle with the VCI device, the method further comprises:

detecting whether a charging gun is inserted into a charging interface of the electric vehicle by the CP detection module; and if it is detected by the CP detection module that the charging gun is inserted into the charging interface of the electric vehicle, performing the step of acquiring an initial electric quantity data value upon start of charging of the electric vehicle with the VCI device.

7. The electric quantity state acquisition method according to claim 1, wherein the charging device comprises a display module; and after the acquiring the electric quantity data value at the current moment, the method further comprises:

displaying the electric quantity data value in real time by the display module.

8. An electric quantity state acquisition device applied to a charging device for charging an electric vehicle, wherein the electric quantity state acquisition device comprises: at least one processor and a memory communicatively coupled to the at least one processor, the memory storing instructions executable by the at least one processor to:

acquire an initial electric quantity data value upon start of charging of the electric vehicle with a VCI device;

acquire charging current of a battery of the electric vehicle during a charging process;

acquire an electric quantity of the battery at a current moment according to the charging current; and acquire the electric quantity data value at the current moment by calculating a sum of the initial electric quantity data and a ratio of the electric quantity to a rated total capacity of the electric vehicle, the electric quantity data value indicating a state-of-charge of the battery at the current moment.

9. The electric quantity state acquisition device according to claim 8, wherein before the processor executes the step of acquiring the electric quantity data value at the current moment on the basis of the initial electric quantity data, the electric quantity, and a rated total capacity of the electric vehicle, the at least one processor further executes a step of:

acquiring a vehicle identification code of the electric vehicle via the VCI device; and obtaining the rated total capacity of the electric vehicle by retrieving a predetermined correspondence using the vehicle identification code.

10. The electric quantity state acquisition device according to claim 8, wherein when the processor executes the step of acquiring an electric quantity of the battery at a current moment on the basis of the charging current, the at least one processor further executes a step of: the electric quantity $C_t$ of the battery at the current moment is: $C_t=\int_{t0}^{t}\eta I\cdot d_\tau$, $\eta$ representing charging efficiency, I representing the charging current at moment t, moment t representing the current moment, moment $t_0$ representing the moment at which charging is just started, and $d_\tau$ representing an integral over time.

11. The electric quantity state acquisition device according to claim 10, wherein the electric quantity data value is an SOC value, the SOC value being a ratio of a remaining electric quantity of the battery to a nominal capacity of the battery.

12. The electric quantity state acquisition device according to claim 11, wherein the SOC value SOC at the current moment is $$SOC_t = \left(SOC_0 + \frac{C_t}{C_{rated}}\right) \times 100\%,$$

the $SOC_0$ being an initial SOC value and $C_{rated}$ being the rated total capacity.

13. The electric quantity state acquisition device according to claim 8, wherein the charging device comprises a CP detection module, before the at least one processor executes the step of acquiring an initial electric quantity data value upon start of charging of the electric vehicle with the VCI device, the a processor further executes a step of:

detecting whether a charging gun is inserted into a charging interface of the electric vehicle by the CP detection module; and if it is detected by the CP detection module that the charging gun is inserted into the charging interface of the electric vehicle, performing the step of acquiring an initial electric quantity data value upon start of charging of the electric vehicle with the VCI device.

14. The electric quantity state acquisition device according to claim 8, wherein the charging device comprises a display module; after the at least one processor executes the step of acquiring the electric quantity data value at the current moment, the at least one processor further executes a step of: displaying the electric quantity data value in real time by the display module.

15. A charging device, comprising: a CP detection module for detecting whether a charging gun is inserted into a charging interface of the electric vehicle;

a control module, coupled to the CP detection module, for determining the electric quantity data value of the battery of the electric vehicle at any moment when the CP detection module detects that the charge gun is inserted into the charging interface of the electric vehicle, the control module comprising:

at least one processor and a memory communicatively coupled to the at least one processor, the memory storing instructions executable by the at least one processor to:

acquire an initial electric quantity data value upon start of charging of the electric vehicle with a VCI device;

acquire a charging current of a battery of the electric vehicle during a charging process;

acquire an electric quantity of the battery at a current moment according to the charging current; and acquire the electric quantity data value at the current moment by calculating a sum of the initial electric quantity data and a ratio of the electric quantity to a rated total capacity of the electric vehicle, the electric quantity data value indicating a state-of-charge of the battery at the current moment.

16. The charging device according to claim 15, wherein the charging device further comprises: a sampling module for collecting a charging current of the battery of the electric vehicle during the charging process; and a display module for displaying the electric quantity data value of the battery in real time.

17. The charging device according to claim 15, wherein the charging device is a charging pile.

* * * * *